United States Patent
Russo

(10) Patent No.: US 6,487,259 B1
(45) Date of Patent: Nov. 26, 2002

(54) PARTIALLY-PARRALLEL TRELLIS DECODER APPARATUS AND METHOD

(75) Inventor: David William Russo, Woodinville, WA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/382,170

(22) Filed: Aug. 24, 1999

(51) Int. Cl.[7] .................................................. H03D 1/00
(52) U.S. Cl. ........................ 375/341; 714/792; 375/349
(58) Field of Search ................................. 375/341, 316, 375/340, 346, 349; 714/792, 794, 795, 796

(56) References Cited

U.S. PATENT DOCUMENTS

| | | | |
|---|---|---|---|
| 5,146,475 A | | 9/1992 | Kubo |
| 5,191,598 A | | 3/1993 | Bäckstrom et al. |
| 5,195,106 A | | 3/1993 | Kazecki et al. |
| 5,202,903 A | | 4/1993 | Okanoue |
| 5,272,727 A | | 12/1993 | Okanoue |
| 5,432,821 A | | 7/1995 | Polydoros et al. |
| 5,872,816 A | * | 2/1999 | Parr et al. ................... 375/316 |
| 6,026,121 A | * | 2/2000 | Sadjadpour ................. 375/262 |

FOREIGN PATENT DOCUMENTS

| | | |
|---|---|---|
| EP | 0436101 | 11/1990 |
| EP | 0550143 | 11/1992 |

OTHER PUBLICATIONS

Omidi MJ et al, "Joint Data and Kalman Estimation of Rayleigh Fading Channels, " 1999 Wireless Personal Communications 10, Pp. 319–339.

Omidi MJ et al, "Joint Data and Channel Estimation using the Per–Branch Processing Method," Signal Processing Advances in Wireless Communications, First IEEE Signal Processing Workshop in 1997, pp.: 389–392.

Sun HW et al, "A Modified Filterbank for Tracking Multiple Sinusoidal Signals," School of Electronic & Manufacturing Systems Engineering, pp. 686–691.

Jingdong Lin et al., Joint Data and Channel Estimation for TDMA Mobile Channels, IEEE Trans. Comm. 235–39 (1992).

Riccardo Raheli et al., The Principle of Per–Survivor Processing: A General Approach to Approximate and Adaptive MLSE, Conf. Rec. GLOBECOM '91 pp. 1170–1175 (1991).

* cited by examiner

Primary Examiner—Stephen Chin
Assistant Examiner—David B. Lugo
(74) Attorney, Agent, or Firm—Sylvia Y. Chen; Roland K. Bowler II

(57) ABSTRACT

The partially-parallel trellis decoder with equalizer (360) uses multiple channel estimators (377, 379) but less than one independent channel estimator for each state. The state information set from the state with the best state metric as computed during the previous time period is used to update a primary channel estimator (377), and a state information set from the state with the second best state metric as computed during the previous time period is used to update a secondary channel estimator (379). Each updated channel estimator (377, 379) processes the corresponding state information set to calculate the possible transmitted symbols and their associated state metrics. Because there are fewer channel estimators than states, any unassigned states are processed using the primary channel estimator (377) but do not update the primary channel estimator (377).

20 Claims, 3 Drawing Sheets

PARTIALLY-PARRALLEL TRELLIS DECODER APPARATUS AND METHOD

FIELD OF THE INVENTION

This invention relates generally to a method and apparatus for decoding a received digital signal using a maximum likelihood sequence estimation (MLSE), or trellis, decoder under common fading channel conditions.

BACKGROUND OF THE INVENTION

The Viterbi algorithm is a well-known type of MLSE decoding method that can be used to estimate transmitted digital sequences from a signal received over a communication channel. Initial data (training symbols) decoded by a Viterbi decoder are used to construct an initial channel estimate that is then used to decode the body of the received signal. As the received signal is used to construct a trellis, the state transition metric of each state transition from a time $t=(n-1)T$ to a consecutive time $t=nT$ in the trellis is either discarded as being invalid according to criteria, such as the minimum mean-squared error criteria, or used to modify the channel estimate for future state transition computations. At the conclusion of the received signal, the trellis is back-traced to obtain the estimated transmitted digital sequence.

If the channel estimate is not accurate initially or during a later portion of the decoding process, due to changing conditions of the communication channel or other reasons, the decoding of the body of the received digital signal can get progressively erroneous. An error in the initial channel estimate may cause the Viterbi decoder to modify the channel estimator in a direction that does not properly track the dynamic communication channel conditions. Additionally, any later-occurring error in the dynamic channel estimate may cause unrecoverable divergence from a replication of the actual dynamic communication channel conditions.

A variation of the above-described conventional Viterbi decoder uses a separate and independent channel estimate for each state in a trellis decoder rather than a single channel estimate for the entire Viterbi decoder. As the trellis is traversed during the Viterbi decoding process, channel estimates for each state are computed from a time $t=(n-1)T$ to a time $t=nT$. When the received digital signal ends, the best cumulative channel estimate is used to determine the estimated transmitted digital sequence by back-tracing through the trellis. Thus, an initial channel estimate can be modified in multiple directions, which reduces the chances that an inaccurate initial channel estimate will result in future channel estimates that progressively worsen. U.S. Pat. No. 5,432,821 issued Jul. 11, 1995 to Polydoros et al. proposes such a full-parallel Viterbi approach and contrasts it with a conventional Viterbi decoder.

Because full-parallel Viterbi processing creates an independent estimate of the communication channel for each state, and each channel estimate requires updating and tracking during each state transition, full-parallel Viterbi processing greatly increases the computational power required to decode a received signal. Thus, there is a need for improved MLSE decoding of received signals compared to conventional Viterbi decoding but with reduced computational complexity compared to full-parallel Viterbi processing.

DETAILED DESCRIPTION OF THE PREFERRED EMBODIMENTS

Figure 1:
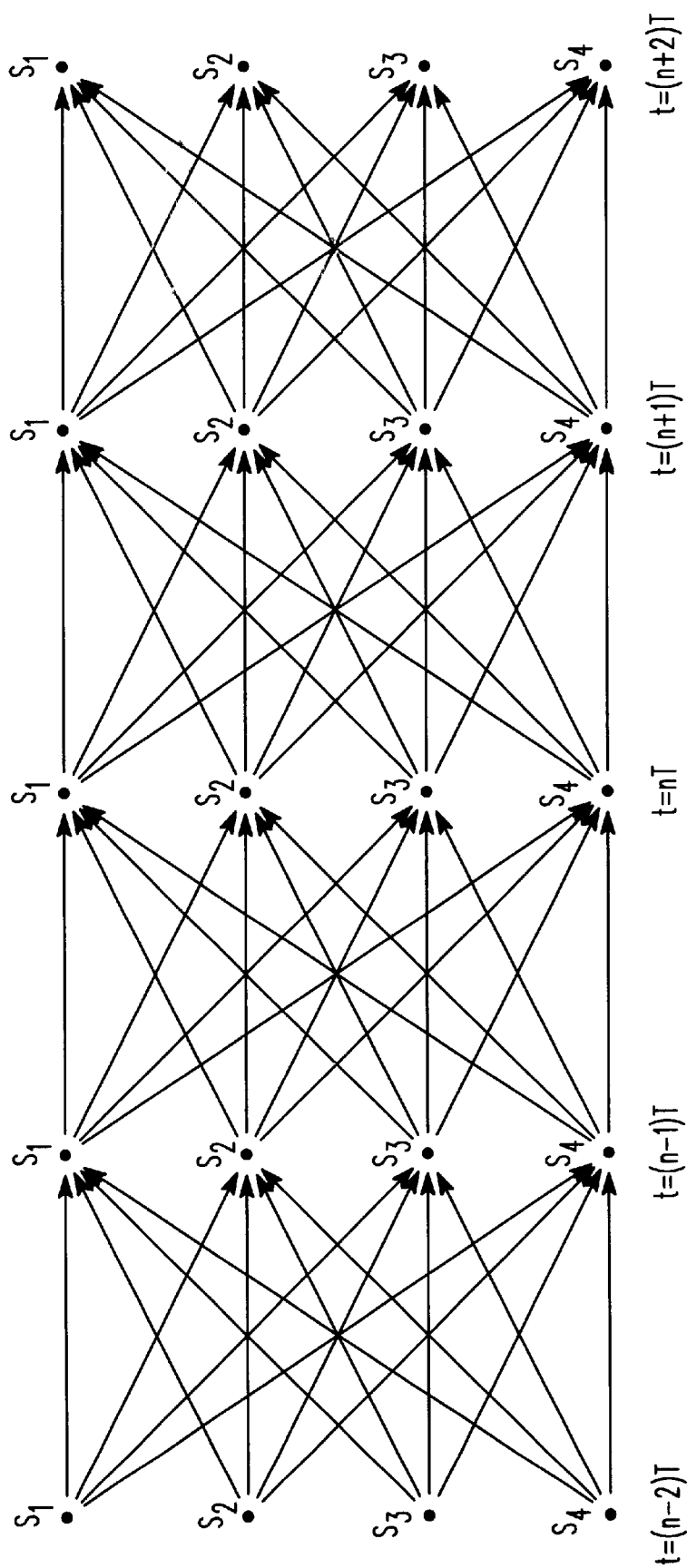
FIG. 1 shows a state transition matrix for a four-state trellis decoder over four time periods.

FIG. 1 shows a state transition matrix 100 for a four-state maximum likelihood sequences estimation (MLSE) trellis decoder, such as a four-state Viterbi decoder, over four time periods T. In the matrix 100, each of four states $s_1$, $s_2$, $s_3$, $s_4$ at time $t=(n-2)T$ has a path to each of four states $s_1$, $s_2$, $s_3$, $s_4$ at time $t=(n-1)T$. Likewise, each of the four states at time $t=(n-1)T$ has a path to each of four states $s_1$, $s_2$, $s_3$, $s_4$ at time $t=nT$, each of the four states at time $t=nT$ has a path to each of four states $s_1$, $s_2$, $s_3$, $s_4$ at time $t=(n+1)T$, and each of the four states at time $t=(n+1)T$ has a path to each of four states $s_1$, $s_2$, $s_3$, $s_4$ at time $t=(n+2)T$. Note the complexity of the complete state transition matrix.

When using such a state transition matrix, a trellis is constructed with a state transition metric weighting for each path from one state to a consecutive state. At the end of the received signal, when the trellis is completed, the decoder back-traces through the trellis and selects the path through the trellis that has the best cumulative state transition metric. The states in this selected path provide the maximum likelihood sequence estimation for the transmitted sequence.

Figure 2:
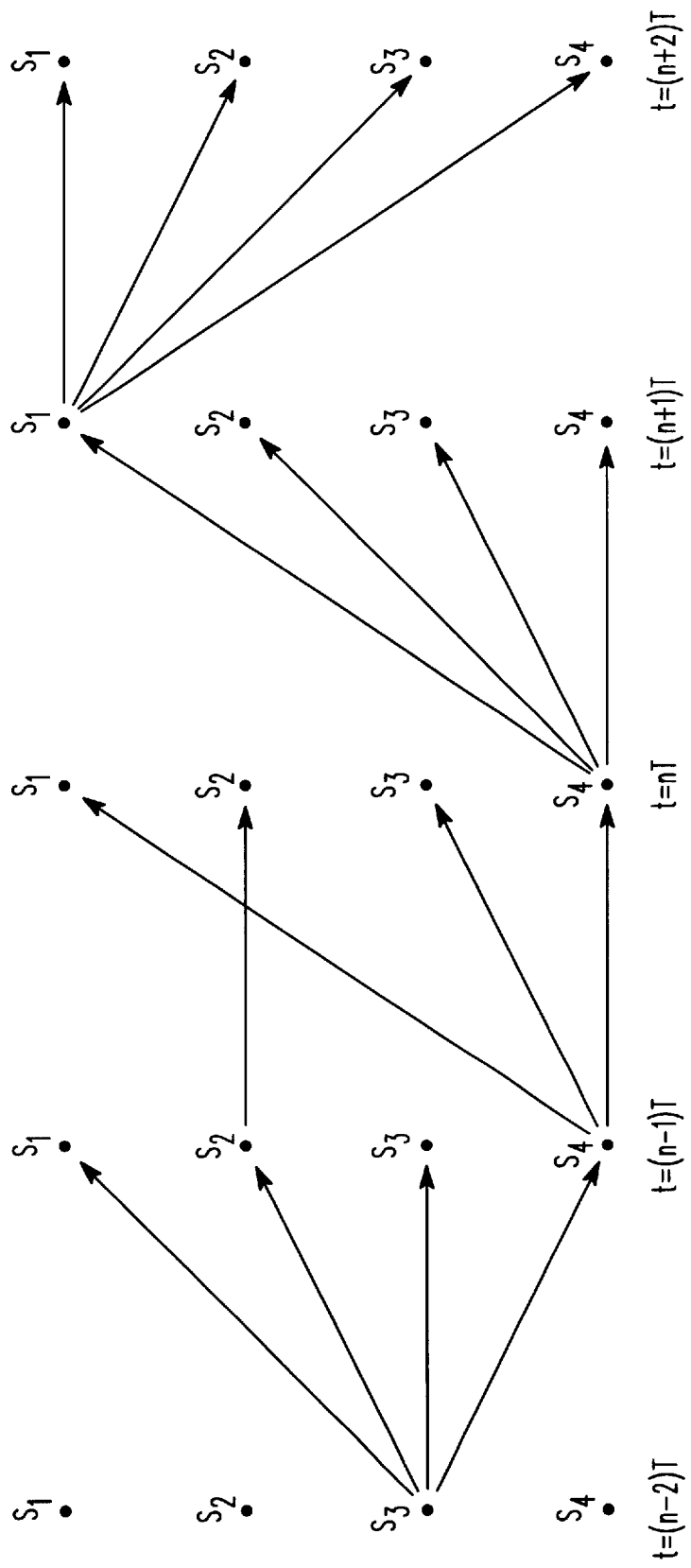
FIG. 2 shows typical state transition paths for a four-state trellis decoder during a fading channel over four time periods.

FIG. 2 shows typical state transition paths 200 for a four-state trellis decoder during a fading channel over four time periods T. In a fading communication channel, most decoding errors occur in groups during the fade. Because of this, most of the paths from one time period to a consecutive time period in a trellis decoder originate from a single state; the other three states are eliminated via per-survival processing using minimum mean-squared error criteria or another elimination method. At time $t=(n-2)T$, only one state $s_3$ has a viable path to each of four states at time $t=(n-1)T$. At time $t=(n-1)T$, two states have viable paths to states at time $t=nT$; state $s_2$ at time $t=(n-1)T$ has a single path to state $s_2$ at time $t=nT$ and state $s_4$ at time $t=(n-1)T$ has paths to three states $s_1$, $s_3$, $s_4$ at time $t=nT$. At time $t=nT$, only one state $s_4$ has a viable path to each of four states at time $t=(n+1)T$, and at time $t=(n+1)T$, only one state $s_1$ has a viable path to each of four states at time $t=(n+2)T$.

The transmission paths 200 indicate a fade in the communication channel between time $t=(n-1)T$ and time $t=nT$ with no deep fades occurring at other times shown. Under non-fading conditions, often only one state will have viable paths continuing to a consecutive state. During a fade, however, often more than one state will have a viable path continuing to a state in a consecutive time period. Under most situations, both fading and non-fading, less than all four states $s_1$, $s_2$, $s_3$, $s_4$ will have paths continuing to a state in a consecutive time period.

Instead of using a single channel estimator for the entire decoder or independent channel estimators for each state of the decoder, the partially-parallel trellis decoder uses an approach that involves multiple channel estimators but less than one independent channel estimator for each state. The state information set from the state with the best state metric as computed during the previous time period is used to update a primary channel estimator, a state information set from the state with the second best state metric as computed during the previous time period is used to update a first secondary channel estimator, a state information set from the state with the third best state metric as computed during the previous time period is used to update a second secondary channel estimator, and so on for each additional channel estimator. A state information set has data regarding the states required to define the transition presently being traversed through a trellis, and a state metric is any metric that can be used to determine a most likely state, which eventually corresponds to a most likely transmitted sequence. A state metric could include state transition metrics, instantaneous symbol errors, or other algorithms.

Once a state information set is used to update a channel estimator, the updated channel estimator processes the state information set to calculate the possible transmitted symbols and their associated state metrics. Because there are fewer channel estimators than states, any unassigned states are processed using the primary channel estimator but do not update the primary channel estimator. The partially-parallel trellis decoder performs better than a conventional Viterbi decoder and uses less computational power then full-parallel Viterbi processing.

Figure 3:
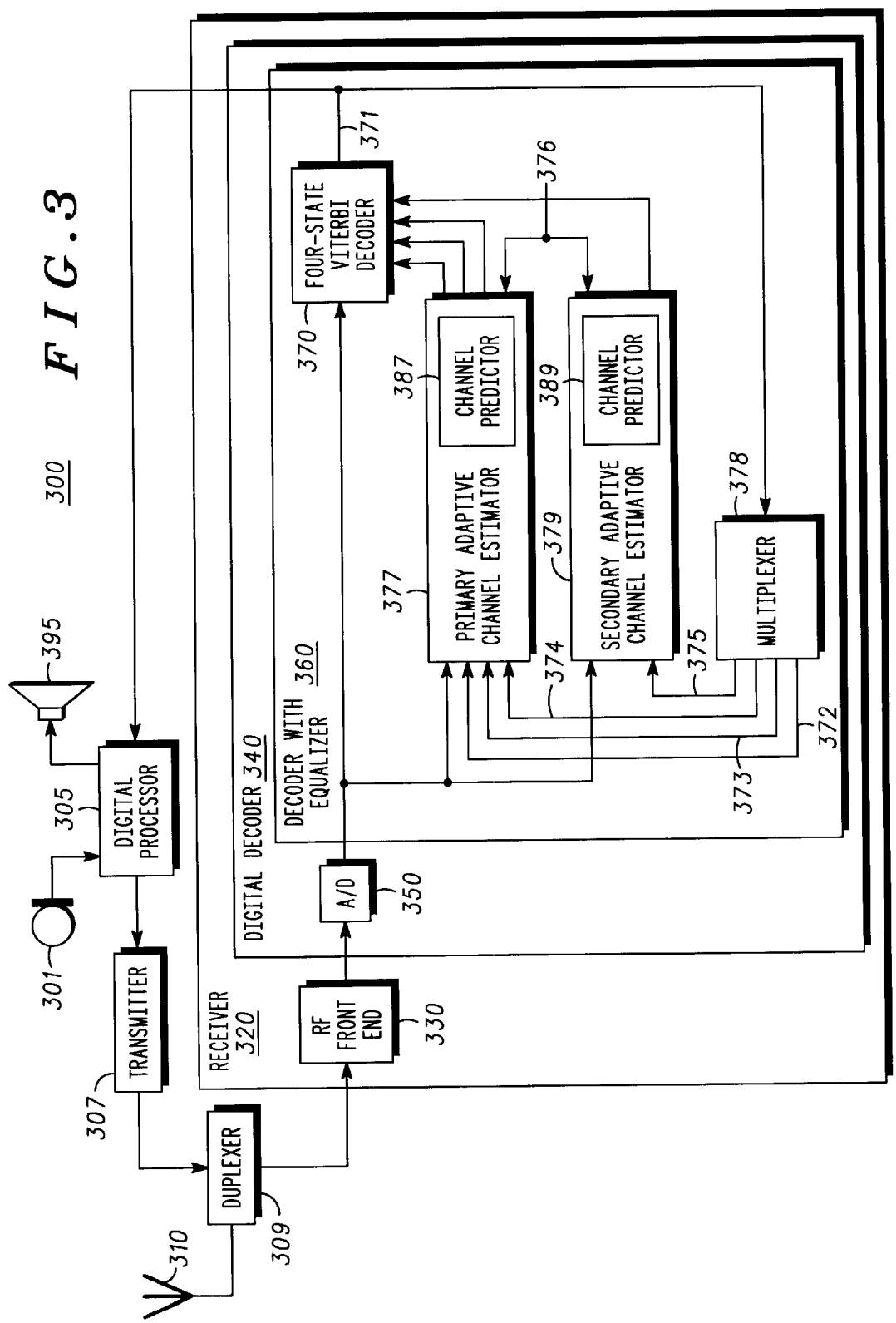
FIG. 3 shows a partially-parallel trellis decoder according to a preferred embodiment as implemented in a radiotelephone.

FIG. 3 shows a block diagram of the preferred embodiment implemented in a radiotelephone 300. The preferred embodiment uses a four-state Viterbi decoder 370 with minimum mean-squared error criteria for per-survival processing. Other types of MLSE decoders with differing numbers of states, however, can be substituted for the four-state Viterbi decoder 370 depending on the application. The radiotelephone 300 has a microphone 301 or other input device coupled to a digital processor 305, which processes audio signals received from the microphone 301. The processed signals are sent to a transmitter 307 for encoding and modulation and a duplexer 309 for transmission over a communication channel via an antenna 310.

Encoded modulated signals received from the communication channel via the antenna 310 are processed by the duplexer 309 and sent to a receiver 320. In the receiver 320, a radio frequency front-end 330 demodulates the received encoded signal to baseband frequency. The baseband signal is then sent to a digital decoder 340. The digital decoder 340 includes an analog-to-digital convertor 350 that sends a received digital encoded signal to a decoder with equalizer 360 implementing the preferred embodiment.

In the partially-parallel trellis decoder with equalizer 360, the received digital encoded signal is sent to a primary adaptive channel estimator 377, a secondary adaptive channel estimator 379, and the four-state Viterbi decoder 370. If desired, one or more adaptive channel estimators can be initialized using a training sequence. Such training is not necessary to decode a received signal, but it may increase accuracy under certain conditions. A training input 376 to the adaptive channel estimators 377, 379 receives a known training sequence and indicates when the received digital signal representing the known training sequence is being sent to the channel estimators 377, 379 from the analog-to-digital convertor 350. Because the received digital sequence from the analog-to-digital convertor 350 is known, an accurate initial estimate of the communication channel can be established within the adaptive channel estimators 377, 379. This provides a starting point for subsequent adaptation of the channel estimate.

When the body of the signal is being decoded, the Viterbi decoder 370 processes the received digital signal from the analog-to-digital convertor 350 to start a trellis. The four-state Viterbi decoder 370 calculates paths from four past states at a time t=(n−1)T to four present states at time t=nT. These paths include state information sets and state metrics. The multiplexer 378 passes state information sets received by the multiplexer input 371 from the Viterbi decoder 370 to the appropriate adaptive channel estimator 377, 379. The state information sets from the state with the best state metric is sent to the primary adaptive channel estimator 377 via a multiplexer output 372. The state information set from the state with the next best state metric is sent to the secondary adaptive channel estimator 379 via another multiplexer output 375.

The primary adaptive channel estimator 377 uses the received digital signal at time t=nT and the received first state information set at time t=(n−1)T from the Viterbi decoder 370 to update the present channel estimate and create a primary updated channel estimate. Then, the adaptive channel estimator 377 processes the first state information set using the primary updated channel estimate to calculate the possible transmitted symbols and their associated state metrics. Similarly, the secondary adaptive channel estimator 379 uses the received digital signal at time t=nT and the second state information set provided by the state with the next best state metric at time t=(n−1)T from the Viterbi decoder 370 to update the present channel estimate and then processes the second state information set using the secondary updated channel estimate to calculate the possible transmitted symbols and their associated state transition metrics.

The remaining two states, with the third and fourth best state metrics, are sent via multiplexer outputs 373, 374 and processed through the primary adaptive channel estimator 377 but do not update the adaptive channel estimator 377. In the preferred embodiment, the adaptive channel estimators 377, 379 include optional channel predictors 387, 389, which filter the updated channel estimates to provide a smoother estimate of the communication channel as it changes over time. Channel predictors 387, 389 are not required by the partially-parallel trellis decoder; however, in many systems channel predictors 387, 389 will improve the results.

The possible transmitted symbols and their associated state metrics from the adaptive channel estimators 377, 379 are sent to the four-state Viterbi decoder 370 to assist in constructing a trellis. When the Viterbi decoder 370 has completed construction of the trellis, it back-traces through the trellis to find the path with the best cumulative state metric. The path with the best cumulative state metric is the maximum likelihood sequence estimation, also called the estimated transmitted digital sequence. This estimated transmitted digital sequence is forwarded to the digital processor 305 for final processing and eventual output via an audio speaker 395 or other output device.

Thus, for a four-state Viterbi decoder 370, less than four adaptive channel estimators are used to decode a received digital encoded signal. Variations on the preferred embodiment can easily be employed by one skilled in the art. For example, a partially-parallel four-state Viterbi decoder could use more than one secondary adaptive channel estimator instead of the single secondary adaptive channel estimator shown in FIG. 3. In such a variation, the state information set from the state with the best state metric updates and is processed by the primary adaptive channel estimator, the state information set from the state with the second best state metric updates and is processed by a first secondary adaptive channel estimator, the state information set from the state with the third best state metric updates and is processed by the second secondary adaptive channel estimator, and the state information set from the state with the fourth best, or worst, state metric is only processed by the primary adaptive channel estimator.

In another alternate embodiment, the number of secondary adaptive channel estimators is reduced during non-fading periods. If, for example, the signal-to-noise ratio is acceptable during a period, then one or more secondary adaptive channel equalizers can be deactivated and thus decrease processing requirements during that period. Should a fade occur and the signal-to-noise ratio decrease below a certain threshold, then one or more secondary adaptive channel equalizers can be reactivated to compensate for deteriorating channel conditions.

Secondary adaptive channel estimators provide a recovery mechanism for the decoder with equalizer in the event that the communication channel fades in a direction that is not accurately tracked by the primary adaptive channel estimator. Less than one adaptive channel estimator for each state in the Viterbi decoder provides a reduced-complexity partially-parallel decoder with equalizer.

Thus, the partially-parallel trellis decoder provides a decoder that is more accurate than a traditional Viterbi decoder but less computationally intensive than full-parallel Viterbi processing. While specific components and functions of the partially-parallel trellis decoder are described above, fewer or additional functions could be employed by one skilled in the art within the true spirit and scope of the present invention. The invention should be limited only by the appended claims.

I claim:

1. A partially-parallel trellis decoder for decoding a received digital signal comprising:
    an s-state trellis decoder, where s is an integer greater than or equal to 3, for receiving the received digital signal and computing state information sets and state metrics for state transitions from a time t=(n−1)T to a time t=nT;
    a primary adaptive channel estimator, coupled to the s-state trellis decoder, for updating a primary channel estimate using a first state information set and the received digital signal and for processing the first state information set according to the primary channel estimate; and
    a secondary adaptive channel estimator, coupled to the s-state trellis decoder, for updating a secondary channel estimate using a second state information set and the received digital signal and for processing the second state information set according to the secondary channel estimate,
    wherein a remaining state information set is processed by the primary adaptive channel estimator according to the primary channel estimate.

2. A partially-parallel trellis decoder according to claim 1 wherein the primary adaptive channel estimator includes a first channel predictor for filtering the primary channel estimate.

3. A partially-parallel trellis decoder according to claim 1 wherein the secondary adaptive channel estimator includes a second channel predictor for filtering the secondary channel estimate.

4. A partially-parallel trellis decoder according to claim 1 wherein the s-state trellis decoder determines the first state information set from state metrics corresponding to a most likely transmitted sequence.

5. A partially-parallel trellis decoder according to claim 4 wherein the state metrics include state transition metrics.

6. A partially-parallel trellis decoder according to claim 4 wherein the state metrics include instantaneous symbol errors.

7. A partially-parallel trellis decoder according to claim 4 wherein the s-state trellis decoder determines the second state information set from state metrics corresponding to a second most likely transmitted sequence.

8. A partially-parallel trellis decoder according to claim 1 wherein the s-state trellis decoder uses minimum mean-squared error criteria for per-survival processing.

9. A method for decoding an encoded signal received over a communication channel comprising the steps of:
    constructing a maximum likelihood sequence estimation trellis from the encoded signal;
    determining from the encoded signal at least a first state information set corresponding to a first state metric, a second state information set corresponding to a second state metric, and a third state information set corresponding to a third state metric;
    updating a primary communication channel estimate using the first state information set and the encoded signal;
    processing the first state information set using the primary communication channel estimate and modifying the trellis;
    updating a secondary communication channel estimate using the second state information set and the encoded signal;
    processing the second state information set using the second communication channel estimate and modifying the trellis;
    processing the third state information set using the primary communication channel estimate and modifying the trellis; and
    back-tracing the trellis to construct a maximum likelihood estimated sequence.

10. A method for decoding a received encoded signal according to claim 9 further comprising the step of:
    initializing the primary channel communication estimate using a known training sequence before the step of determining.

11. A method for decoding a received encoded signal according to claim 10 further comprising the step of:
    initializing the secondary channel communication estimate using the known training sequence before the step of determining.

12. A method for decoding a received encoded signal according to claim 9 further comprising the steps of:
    filtering the primary communication channel estimate after the step of updating a primary communication channel estimate.

13. A method for decoding a received encoded signal according to claim 12 further comprising the steps of:
    filtering the secondary communication channel estimate after the step of updating a secondary communication channel estimate.

14. A radiotelephone, having a receiver with a digital decoder for decoding a received signal, comprising:
    an s-state trellis decoder, where s is an integer greater than or equal to 3, for computing state information sets and state metrics for state transitions from a time t=(n−1)T to a time t=nT from the received signal;
    a primary adaptive channel estimator, coupled to the s-state trellis decoder, for updating a primary channel estimate using a first state information set and the received signal and for processing the first state information set according to an updated primary channel estimate and for processing a third state information set according to the updated primary channel estimate; and a secondary adaptive channel estimator, coupled to the s-state trellis decoder, for updating a secondary channel estimate using a second state information set and the received signal and for processing the second state information set according to an updated secondary channel estimate.

15. A radiotelephone according to claim 14 wherein the primary adaptive channel estimator includes a first channel predictor for filtering the primary channel estimate.

16. A radiotelephone according to claim 14 wherein the secondary adaptive channel estimator includes a second channel predictor for filtering the secondary channel estimate.

17. A radiotelephone according to claim 14 wherein the s-state trellis decoder determines the first state information set from state metrics corresponding to a most likely transmitted sequence.

18. A radiotelephone according to claim 14 wherein the s-state trellis decoder determines the second state information set from state metrics corresponding to a second most likely transmitted sequence.

19. A radiotelephone according to claim 14 wherein the s-state trellis decoder determines the third state information set from state metrics corresponding to a third most likely transmitted sequence.

20. A radiotelephone according to claim 14 wherein the s-state trellis decoder uses minimum mean-squared error criteria for per-survival processing.

\* \* \* \* \*